(12) United States Patent
Krick et al.

(10) Patent No.: US 9,058,269 B2
(45) Date of Patent: Jun. 16, 2015

(54) METHOD AND APPARATUS INCLUDING A PROBE FILTER FOR SHARED CACHES UTILIZING INCLUSION BITS AND A VICTIM PROBE BIT

(75) Inventors: Robert Krick, Longmont, CO (US); John M. King, Austin, TX (US); Tarun Nakra, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 51 days.

(21) Appl. No.: 13/532,009

(22) Filed: Jun. 25, 2012

(65) Prior Publication Data

US 2013/0346694 A1    Dec. 26, 2013

(51) Int. Cl.
*G06F 12/08* (2006.01)

(52) U.S. Cl.
CPC ........ *G06F 12/0811* (2013.01); *G06F 12/0815* (2013.01); *G06F 12/0822* (2013.01); *G06F 2212/621* (2013.01); *G06F 2212/62* (2013.01); *G06F 12/0831* (2013.01); *G06F 12/084* (2013.01)

(58) Field of Classification Search
None
See application file for complete search history.

(56) References Cited

U.S. PATENT DOCUMENTS

| 4,890,238 | A |   | 12/1989 | Klein et al. |         |
|-----------|---|---|---------|--------------|---------|
| 5,530,832 | A | * | 6/1996  | So et al. ........................ | 711/122 |
| 5,721,864 | A |   | 2/1998  | Chiarot et al. |         |
| 5,996,048 | A | * | 11/1999 | Cherabuddi et al. .......... | 711/122 |
| 6,810,467 | B1 | * | 10/2004 | Khare et al. ................... | 711/146 |
| 7,934,059 | B2 |   | 4/2011  | Papazova et al. |         |
| 2002/0010836 | A1 | * | 1/2002 | Barroso et al. ................ | 711/122 |
| 2006/0053258 | A1 | * | 3/2006 | Liu et al. ....................... | 711/145 |
| 2007/0005899 | A1 | * | 1/2007 | Sistla et al. .................... | 711/134 |
| 2013/0042070 | A1 | * | 2/2013 | Jalal et al. ..................... | 711/130 |
| 2013/0042078 | A1 | * | 2/2013 | Jalal et al. ..................... | 711/146 |
| 2013/0311724 | A1 | * | 11/2013 | Walker et al. ................. | 711/136 |

OTHER PUBLICATIONS

Conway et al., "Cache Hierarchy and Memory Subsystem of the AMD Opteron Processor" Micro, IEEE; Date of Publication: Mar.-Apr. 2010;vol. 30, Issue: 2 pp. 16-29.
U.S. Appl. No. 13/706,321, filed Dec. 5, 2012, entitled "Eliminating Fetch Cancel for Inclusive Caches".
Chang et al., "Automatic I/O Hint Generation Through Speculative Execution", Feb. 1999, Proceedings of the 3rd Symposium on OS Design and Implementation, New Orleans, LA, 15 pages.

* cited by examiner

*Primary Examiner* — Tuan Thai
*Assistant Examiner* — Glenn Gossage

(57) ABSTRACT

A method and apparatus use one or more inclusion bits and a victim bit to filter probes to shared caches. One embodiment of the method includes filtering a probe or snoop of one or more of a plurality of first caches based on a plurality of first bits, such as inclusion bits, associated with a line indicated by the probe or snoop. Each of the plurality of first bits is associated with a different subset of the plurality of first caches and each first bit indicates whether the line is resident in a corresponding subset of the plurality of first caches. A second bit, such as a victim probe bit, indicates whether the line is resident in more than one of the plurality of first caches in at least one of the subsets of the plurality of first caches. The first caches may be L1 caches and the first bits may be stored in an L2 cache of a multilevel cache.

29 Claims, 7 Drawing Sheets

US 9,058,269 B2

METHOD AND APPARATUS INCLUDING A PROBE FILTER FOR SHARED CACHES UTILIZING INCLUSION BITS AND A VICTIM PROBE BIT

BACKGROUND

The claimed subject matter relates generally to processor-based systems, and, more particularly, to cache probe filters in processor-based systems.

Many processing devices utilize caches to reduce the average time required to access information stored in a memory. A cache is a smaller and faster memory that stores copies of instructions and/or data that are expected to be used relatively frequently. For example, central processing units (CPUs) are generally associated with a cache or a hierarchy of cache memory elements. Processors other than CPUs, such as, for example, graphics processing units (GPUs), accelerated processing units (APUs), and others are also known to use caches. Instructions or data that are expected to be used by the CPU are moved from (relatively large and slow) main memory into the cache. When the CPU needs to read or write a location in the main memory, it first checks to see whether the desired memory location is included in the cache memory. If this location is included in the cache (a cache hit), then the CPU can perform the read or write operation on the copy in the cache memory location. If this location is not included in the cache (a cache miss), then the CPU needs to access the information stored in the main memory and, in some cases, the information can be copied from the main memory and added to the cache. Proper configuration and operation of the cache can reduce the latency of memory accesses below the latency of the main memory to a value close to the value of the cache memory.

A cache memory can be implemented using different types of caches that can be accessed at different speeds. One widely used architecture for a CPU cache memory is a hierarchical cache that divides the cache into two levels known as the level 1 (L1) cache and the level 2 (L2) cache. The L1 cache is typically a smaller and faster memory than the L2 cache, which is smaller and faster than the main memory. The CPU first attempts to locate requested memory locations in the L1 cache and then proceeds to look successively in the L2 cache and the main memory when it is unable to find the memory location in the cache. The L1 cache can be further subdivided into separate L1 caches for storing instructions (L1-I) and data (L1-D). The L1-I cache can be placed (logically or physically) near entities that require more frequent access to instructions than data, whereas the L1-D can be placed closer (logically or physically) to entities that require more frequent access to data than instructions. The L2 cache is typically associated with both the L1-I and L1-D caches and can store copies of instructions or data that are retrieved from the main memory. Frequently used instructions are copied from the L2 cache into the L1-I cache and frequently used data can be copied from the L2 cache into the L1-D cache. The L2 cache is therefore referred to as a unified cache.

SUMMARY OF EMBODIMENTS

The disclosed subject matter is directed to addressing the effects of one or more of the problems set forth herein. The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In one embodiment, a method is provided for filtering probes to shared caches. One embodiment of the method includes filtering a probe of one or more of a plurality of first caches based on a plurality of first bits associated with a line indicated by the probe. Each of the plurality of first bits is associated with a different subset of the plurality of first caches and each first bit indicates whether the line is resident in a corresponding subset of the plurality of first caches. A second bit indicates whether the line is resident in more than one of the plurality of first caches in at least one of the subsets of the plurality of first caches.

In another embodiment, an apparatus is provided for filtering probes to shared caches. One embodiment of the apparatus includes a first cache and a cache controller. The cache controller is configurable to filter a probe of one or more of a plurality of first caches based on a plurality of first bits associated with a line indicated by the probe. Each of the plurality of first bits is associated with a different subset of the plurality of first caches and each first bit indicates whether the line is resident in a corresponding subset of the plurality of first caches. A second bit indicates whether the line is resident in more than one of the plurality of first caches in at least one of the subsets of the plurality of first caches.

BRIEF DESCRIPTION OF THE DRAWINGS

The disclosed subject matter may be understood by reference to the following description taken in conjunction with the accompanying drawings, in which like reference numerals identify like elements, and in which.

Figure 1:
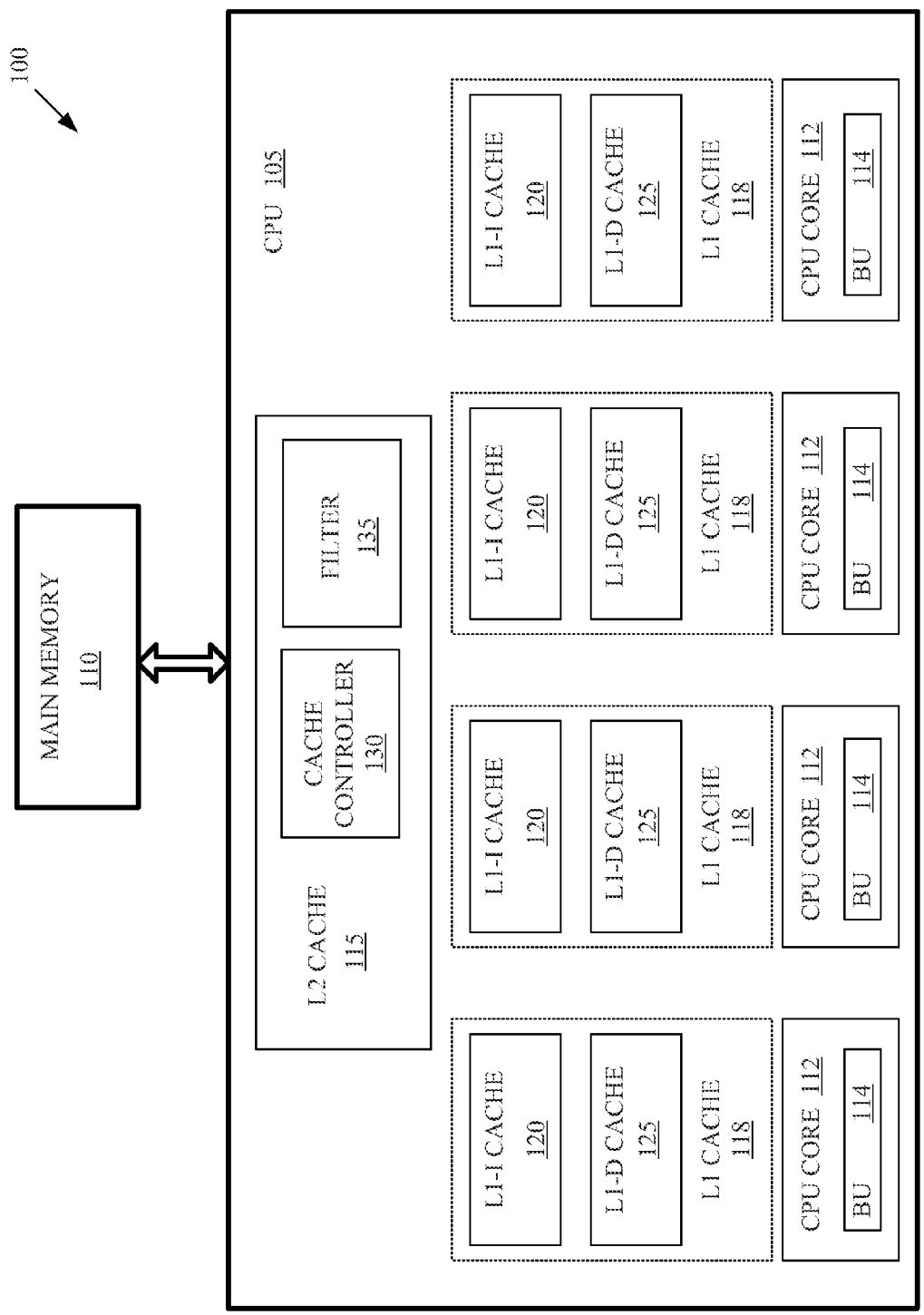
FIG. 1 conceptually illustrates a first exemplary embodiment of a semiconductor device that may be formed in or on a semiconductor wafer.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION OF SPECIFIC EMBODIMENTS

Illustrative embodiments are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. The description and drawings merely illustrate the principles of the claimed subject matter. It should thus be appreciated that those skilled in the art may be able to devise various arrangements that, although not explicitly described or shown herein, embody the principles described herein and may be included within the scope of the claimed subject matter. Furthermore, all examples recited herein are principally intended to be for pedagogical purposes to aid the reader in understanding the principles of the claimed subject matter and the concepts contributed by the inventor(s) to furthering the art, and are to be construed as being without limitation to such specifically recited examples and conditions.

The disclosed subject matter is described with reference to the attached figures. Various structures, systems and devices are schematically depicted in the drawings for purposes of explanation only and so as to not obscure the description with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition is expressly set forth in the specification in a definitional manner that directly and unequivocally provides the special definition for the term or phrase. Additionally, the term, "or," as used herein, refers to a non-exclusive "or," unless otherwise indicated (e.g., "or else" or "or in the alternative"). Also, the various embodiments described herein are not necessarily mutually exclusive, as some embodiments can be combined with one or more other Embodiments to form new embodiments.

Processors such as CPUs, GPUs, or APUs can implement distributed cache memory systems that may support multiple processor cores in the processor. For example, a processor unit may include several processor cores that are associated with a main memory. In one embodiment of a distributed cache memory system, each processor core may include its own L1 cache(s), which may in turn be associated with a higher level L2 cache. In one embodiment, the higher level cache may be inclusive of the lower level caches so that lines resident in the lower level caches are also resident in the higher level cache. The inclusive higher level cache may also include lines that are not resident in the lower level caches. At least in part to maintain cache coherence within the distributed cache memory system, other entities in the computer system may probe the caches in the distributed cache memory system to determine whether the L1 or L2 caches include a requested memory line before the external entity accesses the memory line from the main memory. Probing may also be referred to as sniffing or snooping.

Probe filters may be used to shield lower level caches (such as L1 instruction or data caches) from probes when the higher-level cache (or a dedicated probe filter) can determine that the probe lines are not resident in the lower-level cache. For example, an inclusive L2 cache contains the lines that are resident in its associated L1 caches. The inclusive L2 cache therefore "knows" whether a probed line is resident in the underlying L1 cache and can use this knowledge to filter probes. For example, an inclusive L2 cache can be shared by 4 cores and each core can have an associated L1 cache. The L2 cache can serve as a probe filter for external probes to the four associated L1 caches. The presence of a cache line in the L2 cache indicates that an external probe of the L2 cache line may hit a line in one of the underlying L1 caches. However, since the line could be resident in any of the underlying L1 caches, all underlying L1 caches are probed in response to each hit in the L2 cache. However, the probed line in the L2 cache may not be resident in any of the underlying L1 caches. Consequently, the L2 cache may forward as many as four unnecessary probes to the four cores, e.g., if the requested line is not present in any L1 cache in any core. In one embodiment, the L2 cache can identify the cores that may contain the line by storing an additional "inclusion" bit for each core and each cache line in the inclusive L2 cache. Each inclusion bit indicates whether the cache line is resident in the corresponding core. The inclusion bit can be set when the line is given to the L1 cache and the bit may be cleared when the L1 cache evicts the line. Compared with broadcasting every probe that hits in the L2 to every core, this approach offers reduced latency in responding to probes and minimal performance impact as the L1 cache only needs to service a fraction of external probes.

However, some L2 caches are associated with more than one underlying L1 cache. For example, an inclusive L2 cache may be associated with four underlying L1 caches that are used by four associated cores. Each L1 cache may be further subdivided into an instruction cache, a data cache, or other caches. If each core contains more than a single L1 cache, then storing a single "inclusion" bit in the L2 cache for each cache line and each core is insufficient to indicate which underlying cache includes the probed lines. One alternative is to not allow any cache line to be present in more than a single L1 of a given core. In that case, if a core requests a line and the L2 inclusion bit for that core indicates that it is already present in an L1 in that core, the L2 cache first back-probes the core to evict the line from the core's other L1 caches. However, performance simulations show that this solution results in severe performance degradation in some common applications (not just esoteric self-modifying code sequences). The performance degradation may be caused by applications attempting to use a cache line in the instruction cache and the data cache in the L1 cache simultaneously or concurrently, possibly because some area of the instruction region may be used for static data storage.

Another alternative is to use an up-down inclusion counter to track how many L1 caches in a given core might have the line. The counter for a given core could be incremented when a line was given to an L1 cache for that core and the counter could be decremented when an L1 cache for that core evicted the line. Any external probe that hit a cache line in the L2 cache that had an associated non-zero inclusion counter would require the probe to be forwarded to the corresponding core. A 2-bit inclusion counter would be sufficient for a core which contained both an L1 I-cache and an L1 D-cache. However, a 2-bit inclusion counter is twice as expensive as having a single inclusion bit for each core.

Alternatively, inclusion bits for each core may be combined with one additional victim probe bit per cache line to trade-off between the competing demands to reduce the total number of bits and to accurately filter external probes. In one embodiment, each line in a higher level inclusive cache may be associated with a set of first bits (e.g., inclusion bits) that each indicate whether a cache line is resident in one of a plurality of groups of lower-level caches associated with the higher-level inclusive cache. Each line in the higher-level inclusive cache may also be associated with an additional bit (e.g., a victim probe bit) that may be set in response to a request for a cache line from one of the groups when the inclusion bit for that group is already set. For example, when an inclusive L2 cache is associated with multiple cores and each core contains more than a single L1 cache, the L2 cache can include one inclusion bit per core for each cache line and one additional victim probe bit for each cache line. The victim probe bit is shared by the cores associated with the L2 cache. If a line is only resident in one of the L1 caches in a given core, the inclusion bit is used to filter probes to the L1 caches associated with each core.

The victim probe bit may be set when a core requests a line and the inclusion bit for that core is already set (e.g., the requested line is already resident in one of the L1 caches for a core and the other L1 cache for the same core requests the line). When an L1 cache evicts a line and the victim probe bit is set, the L2 cache back-probes the core before the inclusion bit is cleared. Since there is only a single victim probe bit per cache line, some of these back-probes may not be necessary (e.g., only a single L1 cache for a given core may actually have the line but the victim probe bit is set due to activity by another core). Once the victim probe bit is set, it can only be cleared when none of the cores have the cache line, e.g., all inclusion bits for that cache line are clear. In other embodiments, inclusion and victim probe bits may be used with a dedicated probe filter instead of an inclusive cache.

FIG. 1 conceptually illustrates a first exemplary embodiment of a semiconductor device 100 that may be formed in or on a semiconductor wafer (or die). The semiconductor device 100 may be formed in or on the semiconductor wafer using well known processes such as deposition, growth, photolithography, etching, planarising, polishing, annealing, and the like. In the illustrated embodiment, the device 100 includes a central processing unit (CPU) 105 that is configured to access instructions and/or data that are stored in the main memory 110. In the illustrated embodiment, the CPU 105 includes four CPU cores 112 that may be used to execute the instructions and/or manipulate the data. The processor cores 112 may include a bus unit (BU) 114 for managing communication over bridges or buses in the semiconductor device 100. The illustrated embodiment of the CPU 105 also implements a hierarchical (or multilevel) cache system that is used to speed access to the instructions and/or data by storing selected instructions and/or data in the caches. However, persons of ordinary skill in the art having benefit of the present disclosure should appreciate that alternative embodiments of the device 100 may implement different configurations of the CPU 105, such as configurations that use external caches, different types of processors (e.g., GPUs or APUs), or different numbers of processor cores 112. Moreover, alternative embodiments may associate different numbers and/or types of caches 118, 120, 125 with the different processor cores 112.

The illustrated cache system includes a level 2 (L2) cache 115 for storing copies of instructions and/or data that are stored in the main memory 110. In the illustrated embodiment, the L2 cache 115 is 4-way associative to the main memory 110 so that each line in the main memory 110 can potentially be copied to and from 4 particular lines (which are conventionally referred to as "ways") in the L2 cache 115. However, persons of ordinary skill in the art having benefit of the present disclosure should appreciate that alternative embodiments of the main memory 110 and/or the L2 cache 115 can be implemented using any associativity including 2-way associativity, 8-way associativity, 16-way associativity, direct mapping, fully associative caches, and the like. Relative to the main memory 105, the L2 cache 115 may be implemented using smaller and faster memory elements. The L2 cache 115 may also be deployed logically and/or physically closer to the CPU core 112 (relative to the main memory 110) so that information may be exchanged between the CPU core 112 and the L2 cache 115 more rapidly and/or with less latency.

The illustrated cache system also includes L1 caches 118 for storing copies of instructions and/or data that are stored in the main memory 110 and/or the L2 cache 115. Each L1 cache 118 is associated with a corresponding processor core 112. In one embodiment, the L1 cache 118 may be implemented in the corresponding processor core 112. Alternatively, the L1 cache 118 may be implemented outside the corresponding processor core 112 and may be physically, electromagnetically, or communicatively coupled to the corresponding processor core 112. Relative to the L2 cache 115, the L1 cache 118 may be implemented using smaller and faster memory elements so that information stored in the lines of the L1 cache 118 can be retrieved quickly by the corresponding processor core 112. The L1 cache 118 may also be deployed logically and/or physically closer to the CPU core 112 (relative to the main memory 110 and the L2 cache 115) so that information may be exchanged between the CPU core 112 and the L1 cache 118 more rapidly and/or with less latency (relative to communication with the main memory 110 and the L2 cache 115).

In the illustrated embodiment, the L1 caches 118 are separated into level 1 (L1) caches for storing instructions and data, which are referred to as the L1-I cache 120 and the L1-D cache 125. Separating or partitioning the L1 cache 118 into an L1-I cache 120 for storing instructions and an L1-D cache 125 for storing data may allow these caches to be deployed closer to the entities that are likely to request instructions and/or data, respectively. Consequently, this arrangement may reduce contention, wire delays, and generally decrease latency associated with instructions and data. In one embodiment, a replacement policy dictates that the lines in the L1-I cache 120 are replaced with instructions from the L2 cache 115 and the lines in the L1-D cache 125 are replaced with data from the L2 cache 115. However, persons of ordinary skill in the art should appreciate that in alternative embodiments the L1 caches 118 may be partitioned into different numbers or types of caches. Furthermore, persons of ordinary skill in the art should appreciate that some programming or configuration techniques may allow the L1-I cache 120 to store data or the L1-D cache 125 to store instructions, at least on a temporary basis.

In the illustrated embodiment, the L2 cache 115 is inclusive so that cache lines resident in the L1 caches 118, 120, 125 are also resident in the L2 cache 115. Persons of ordinary skill in the art having benefit of the present disclosure should appreciate that the L1 caches 118 and the L2 cache 115 represent one exemplary embodiment of a multi-level hierarchical cache memory system. Alternative embodiments may use different multilevel caches including elements such as level 0 (L0) caches, L1 caches, L2 caches, level 3 (L3) caches, and the like.

In operation, because of the low latency, a core 112 first checks its corresponding L1 caches 118, 120, 125 when it needs to retrieve or access an instruction or data. If the request to the L1 caches 118, 120, 125 misses, then the request may be directed to the L2 cache 115, which can be formed of a relatively larger and slower memory element than the L1 caches 118, 120, 125. The main memory 110 is formed of memory elements that are larger and slower than the L2 cache 115 and so the main memory 110 may be the object of a request in response to cache misses from both the L1 caches 118, 120, 125 and the unified L2 cache 115. The L2 cache 115 may also receive external probes, e.g. via a bridge or a bus, for lines that may be resident in one or more of the corresponding L1 caches 118, 120, 125.

The illustrated embodiment of the L2 cache 115 includes a filter 135 for filtering probes to the L1 caches 118, 120, 125 associated with the different processor cores 112. In one embodiment, the filter 135 may be configured to filter external probes that are directed to lines in the L1 caches 118, 120, 125 based on inclusion bits associated with the line indicated by the probe. The inclusion bits may be associated with different subsets of the L1 caches 118, 120, 125. In the illustrated embodiment, one inclusion bit is used to indicate whether each cache line in the L2 cache 115 is resident in a corresponding L1 cache 118 that is associated with one of the cores 112. The resident line indicated by a set value of an inclusion bit may be in either the L1-I cache 120 or the L1-D cache 125. The filter 135 and the cache controller 130 may also be configured to perform filtering operations such as back probing of the L1 caches 118, 120, 125 based on victim probe bits associated with each line in the L2 cache 115. The victim probe bits indicate whether the line is resident in more than one of the first caches in one or more of the subsets of the plurality of first caches. In the illustrated embodiment, a set value of the victim probe bit for a line indicates that the line is resident in both the L1-I cache 120 and the L1-D cache 125 in at least one L1 cache 118 associated with at least one of the processor cores 112.

A cache controller 130 may be implemented in the CPU 105 to perform operations that may include setting or clearing inclusion bits or victim probe bits that are used to support filtering of external probes to the L1 caches 118, 120, 125, as discussed herein. In the illustrated embodiment, the cache controller 130 is implemented in hardware as part of the L2 cache 115. Using hardware to implement portions of the cache controller 130 that are used to control operations such as setting or clearing inclusion bits or victim probe bits may have a number of advantages that are discussed herein. However, persons of ordinary skill in the art having benefit of the present disclosure should appreciate that in alternative embodiments portions of the cache controller 130 may be implemented in hardware, firmware, software, or any combination thereof. Moreover, the cache controller 130 may be implemented in other locations internal or external to the CPU 105.

Figure 2:
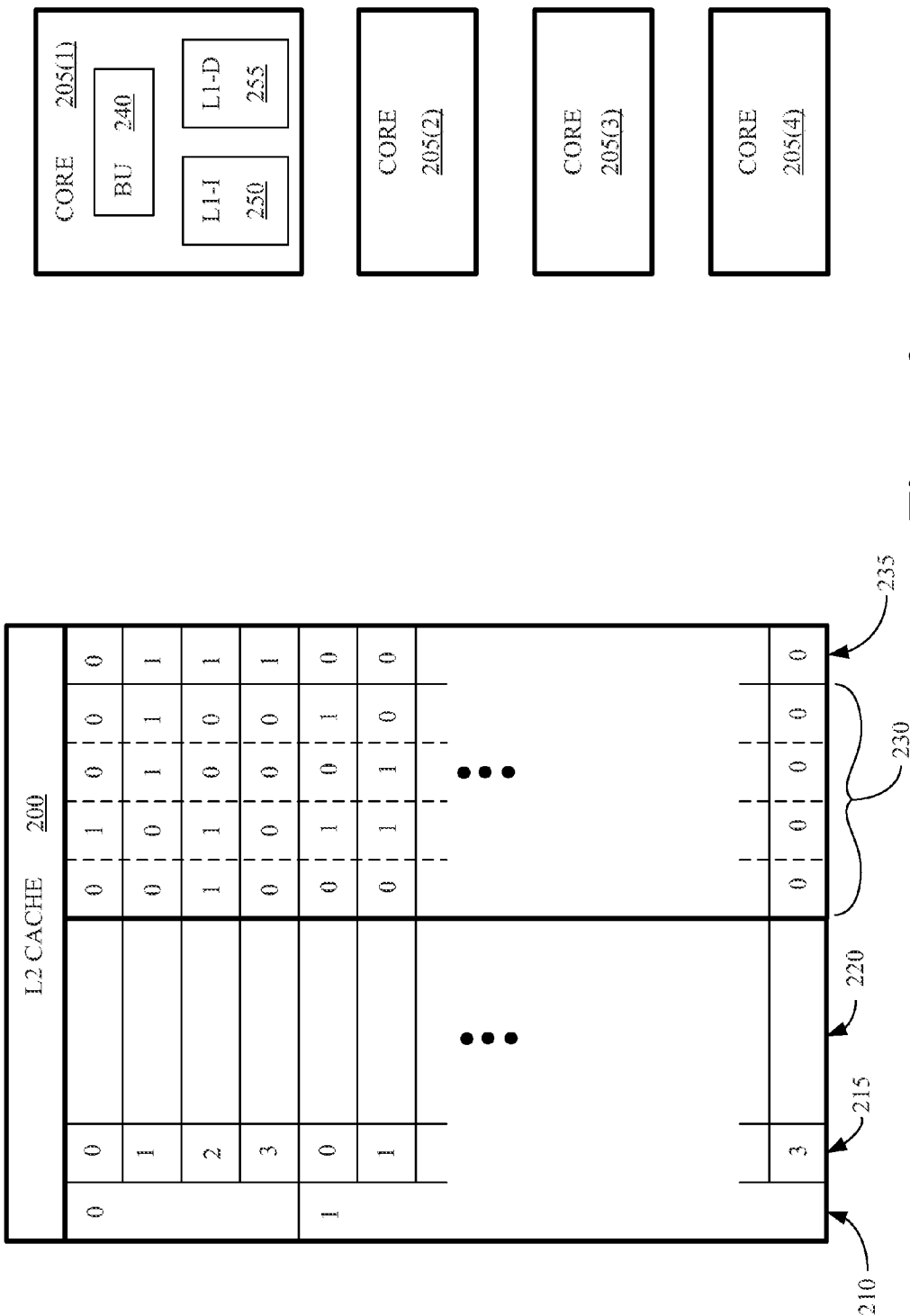
FIG. 2 conceptually illustrates exemplary embodiments of an L2 cache and associated processor cores.

FIG. 2 conceptually illustrates exemplary embodiments of an L2 cache 200 and associated processor cores 205(1)-205(4), which may be referred to as simply processor cores 205. In the illustrated embodiment, the L2 cache 200 is 4-way associative. The indexes are indicated in column 210 and the ways in the L2 cache 200 are indicated by the numerals 0-3 in the column 215. The column 220 indicates the associated cache lines, which may include information or data. In the illustrated embodiment, the L2 cache 200 is inclusive of lines 225 which may be associated with instruction (L1-I) and data (L1-D) caches 250, 255 in the processor cores 205. Alternatively, the instruction (L1-I) and data (L1-D) caches 250, 255 may be implemented external to the processor cores 205 and physically, electromagnetically, or communicatively coupled to the processor cores 205.

Each line in the L2 cache 200 is associated with a set of inclusion bits 230 and a victim probe bit 235. The inclusion bits 230 for each line are associated with different processor cores 205 and may be set to indicate whether the line is resident in either the instruction cache (L1-I) 250 or the data cache (L1-D) cache 255 in the corresponding processor core 205. For example, the inclusion bits 230 for the line (0, 0) indicate that the line (0, 0) is resident in one of the caches in the second processor core 205(2) because the second inclusion bit 230 for this line is set to a value of "1." The victim probe bit 235 may be set to indicate whether the corresponding line is resident in more than one of the caches within any of the processor cores 205. For example, the victim probe bit 235 for the line (0, 0) is not set, i.e. it has a value of "0" in the illustrated embodiment, which indicates that the line (0, 0) is not resident in more than one of the caches within any of the processor cores 205. For another example, the victim probe bit 235 for the line (0, 1) is set, i.e. it has a value of "1" in the illustrated embodiment, which indicates that the line (0, 1) may be resident in more than one of the caches within at least one of the processor cores 205.

The L2 cache 200 may use the values of the inclusion bits 230 to filter probes that are directed to the corresponding processor cores 205. In the illustrated embodiment, control logic in the L2 cache 200 may send a cache line probe to each processor core 205 when the inclusion bit 230 for the cache line and the corresponding core 205 is set. For example, if the L2 cache 200 receives an external probe of the cache line (0, 1), control logic in the L2 cache 200 may send probes to the processor cores 205(3-4). In one embodiment, a bus unit 240 in the processor cores 205(3-4) receives the probe from the L2 cache 200 and internally sends the probe to the instruction cache 250 and data cache 255 in the corresponding processor cores 205(3-4). The bus unit may then aggregate the probe responses from the instruction cache 250 and data cache 255 in the processor cores 205(3-4) and send a response back to the control logic in the L2 cache 200, which may then construct a response to the external probe based on the information received from the bus units that received the probe.

Figure 3:
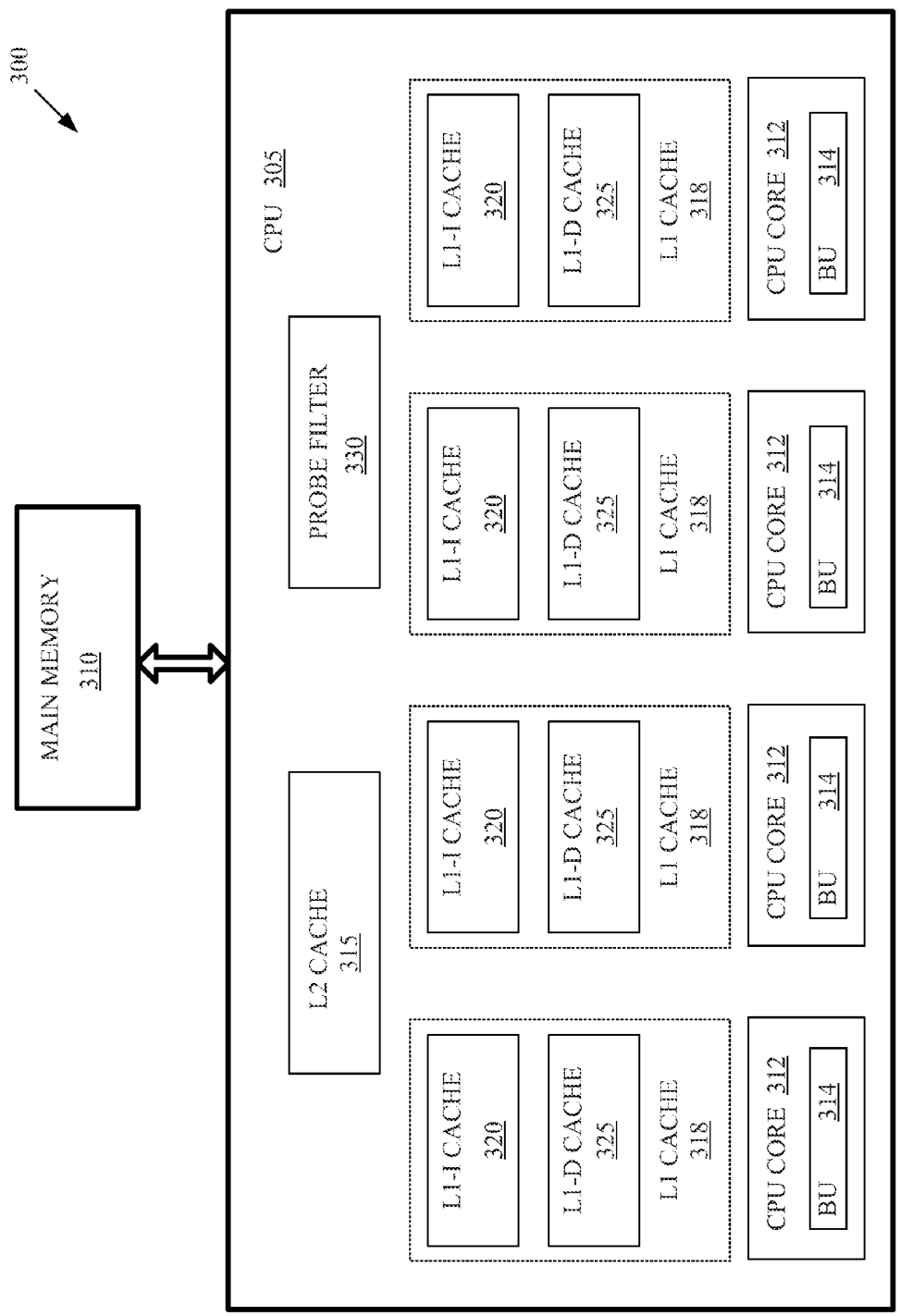
FIG. 3 conceptually illustrates a second exemplary embodiment of a semiconductor device that may be formed in or on a semiconductor wafer.

FIG. 3 conceptually illustrates a second exemplary embodiment of a semiconductor device 300 that may be formed in or on a semiconductor wafer (or die). The semiconductor device 300 may be formed in or on the semiconductor wafer using well known processes such as deposition, growth, photolithography, etching, planarising, polishing, annealing, and the like. In the illustrated embodiment, the device 300 includes a central processing unit (CPU) 305 that is configured to access instructions and/or data that are stored in the main memory 310. In the illustrated embodiment, the CPU 305 includes four CPU cores 312 that may be used to execute the instructions and/or manipulate the data. The processor cores 312 may include a bus unit (BU) 314 for managing communication over bridges or buses in the semiconductor device 300. The illustrated embodiment of the CPU 305 implements a hierarchical (or multilevel) cache system that includes a level 2 (L2) cache 315 and L1 caches 318 that are associated with corresponding processor cores 312. In the illustrated embodiment, the L1 caches 318 are separated into an L1-I cache 320 and an L1-D cache 325. Similar entities have been described in detail with respect to the first exemplary embodiment shown in FIG. 1 and in the interest of clarity these descriptions are not repeated here.

The second exemplary embodiment of the device 300 differs from the first exemplary embodiment of the device or system by implementing a dedicated probe filter 330. Embodiments of the dedicated probe filter 330 may be implemented or operated in a manner that is similar to filtering operations performed by an inclusive cache such as the L2 cache 115 shown in FIG. 1. However, the dedicated probe filter 330 differs from the filter logic in the L2 cache 115 because it does not hold any data for the corresponding cache lines. The dedicated probe filter 330 may hold tag or state information so that the filter 330 can determine whether a given cache line is resident in any of the underlying caches. In alternative embodiments, implementing the probe filter 330 may allow the L2 cache 315 to be implemented as a non-inclusive cache or even to be eliminated. When servicing a probe received by a bridge or bus in the device 300, a miss in the probe filter 330 means that the line is not resident in the underlying caches. In that case, the probe may be blocked, masked, or filtered so that it is not transmitted to the underlying L1 caches or cores. Only probes that hit in the probe filter 330 may probe the underlying caches. The dedicated probe filter 330 may therefore reduce the disruption of the underlying caches by not requiring all of the underlying caches to service every probe.

In one embodiment, the dedicated probe filter 330 may be configured to filter external probes that are directed to lines in the L1 caches 318, 320, 325 based on inclusion bits associated with the line indicated by the probe. The inclusion bits may be associated with different subsets of the L1 caches 318, 320, 325. In the illustrated embodiment, one inclusion bit is used to indicate whether each cache line is resident in a corresponding L1 cache 318 that is associated with one of the cores 312. The resident line indicated by a set value of the inclusion bits may be in either the L1-I cache 320 or the L1-D cache 325. The dedicated probe filter 330 may also be configured to perform filtering operations such as back probing of the L1 caches 318, 320, 325 based on victim probe bits associated with each line. The victim probe bits indicate whether the line is resident in more than one of the caches 320, 325 in one or more of the L1 caches 318. In the illustrated embodiment, a set value of the victim probe bit for a line indicates that the line may be resident in both the L1-I cache 320 and the L1-D cache 325 in at least one L1 cache 318 associated with at least one of the processor cores 312.

Figure 4:
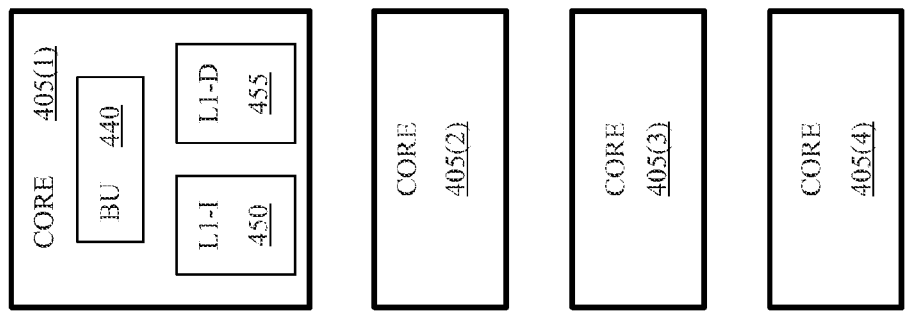
FIG. 4 conceptually illustrates exemplary embodiments of a dedicated probe filter and associated processor cores.
Figure 4:
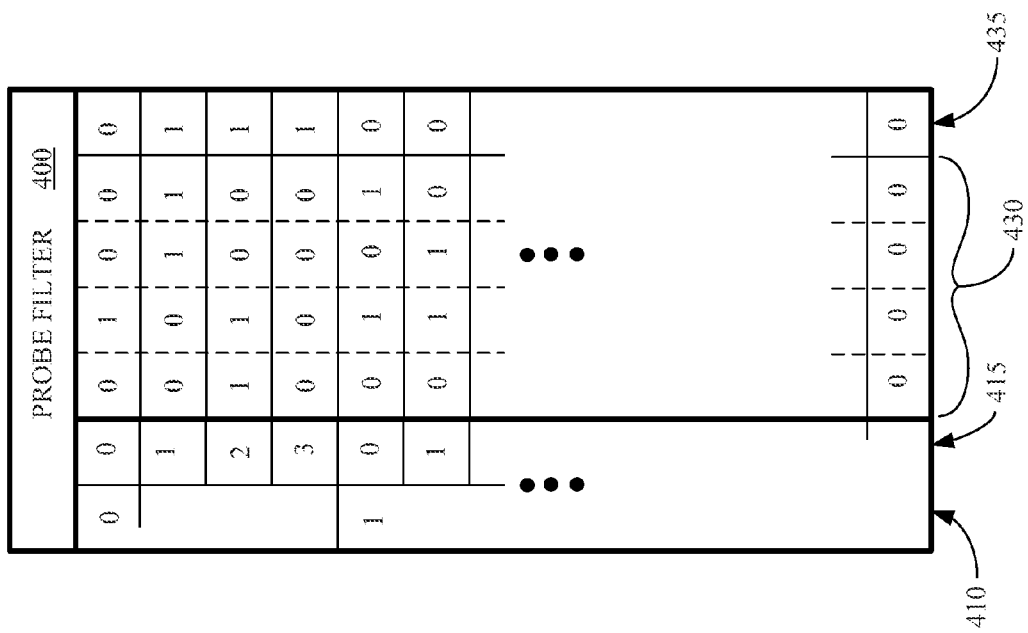

FIG. 4 conceptually illustrates exemplary embodiments of a dedicated probe filter 400 and associated processor cores 405(1)-405(4), which may be referred to as simply processor cores 405. In the illustrated embodiment, the dedicated probe filter 400 includes information indicating lines that may be stored in caches associated with the processor cores 405. For example, the dedicated probe filter 400 may include information indicating indexes and ways of the cache lines. The indexes are indicated in column 410 and the ways are indicated by the numerals 0-3 in the column 415. Each of the processor cores 405 includes (or is associated with) instruction (L1-I) and data (L1-D) caches 450, 455.

Each line in the probe filter 400 is associated with a set of inclusion bits 430 and a victim probe bit 435. The inclusion bits 430 for each line are associated with different processor cores 405 and may be set to indicate whether the line is resident in either the instruction cache (L1-I) 450 or the data cache (L1-D) cache 455 in the corresponding processor core 405. For example, the inclusion bits 430 for the line (0, 0) indicate that the line (0, 0) is resident in one of the caches in the second processor core 405(2) because the second inclusion bit 430 for this line is set to a value of "1." The victim probe bit 435 is set to indicate whether the corresponding line may be resident in more than one of the caches within any of the processor cores 405. For example, the victim probe bit 435 for the line (0, 0) is not set, i.e. it has a value of "0" in the illustrated embodiment, which indicates that the line (0, 0) is not resident in more than one of the caches within any of the processor cores 405. For another example, the victim probe bit 435 for the line (0, 1) is set, i.e. it has a value of "1" in the illustrated embodiment, which indicates that the line (0, 1) may be resident in more than one of the caches within at least one of the processor cores 405.

The dedicated probe filter 400 may use the values of the inclusion bits 430 to filter probes that are directed to the corresponding processor cores 405. In the illustrated embodiment, the probe filter 400 may send a cache line probe to a processor core 405 when the inclusion bit 430 for the cache line and the corresponding core 405 is set. For example, if the probe filter 400 receives an external probe of the cache line (0, 1), the probe filter 400 may send probes to the processor cores 405(3-4) because the third and fourth inclusion bits are set. In one embodiment, a bus unit 440 in the processor cores 405 (3-4) receives the probe and internally sends the probe to the instruction cache 450 and data cache 455 in the corresponding processor cores 405(3-4). The bus unit 440 may then aggregate the probe responses from the instruction and data caches 450, 455 and send a response back to the probe filter 400, which may then construct a response to the external probe based on the information received from the bus units that received the probe.

Figure 5:
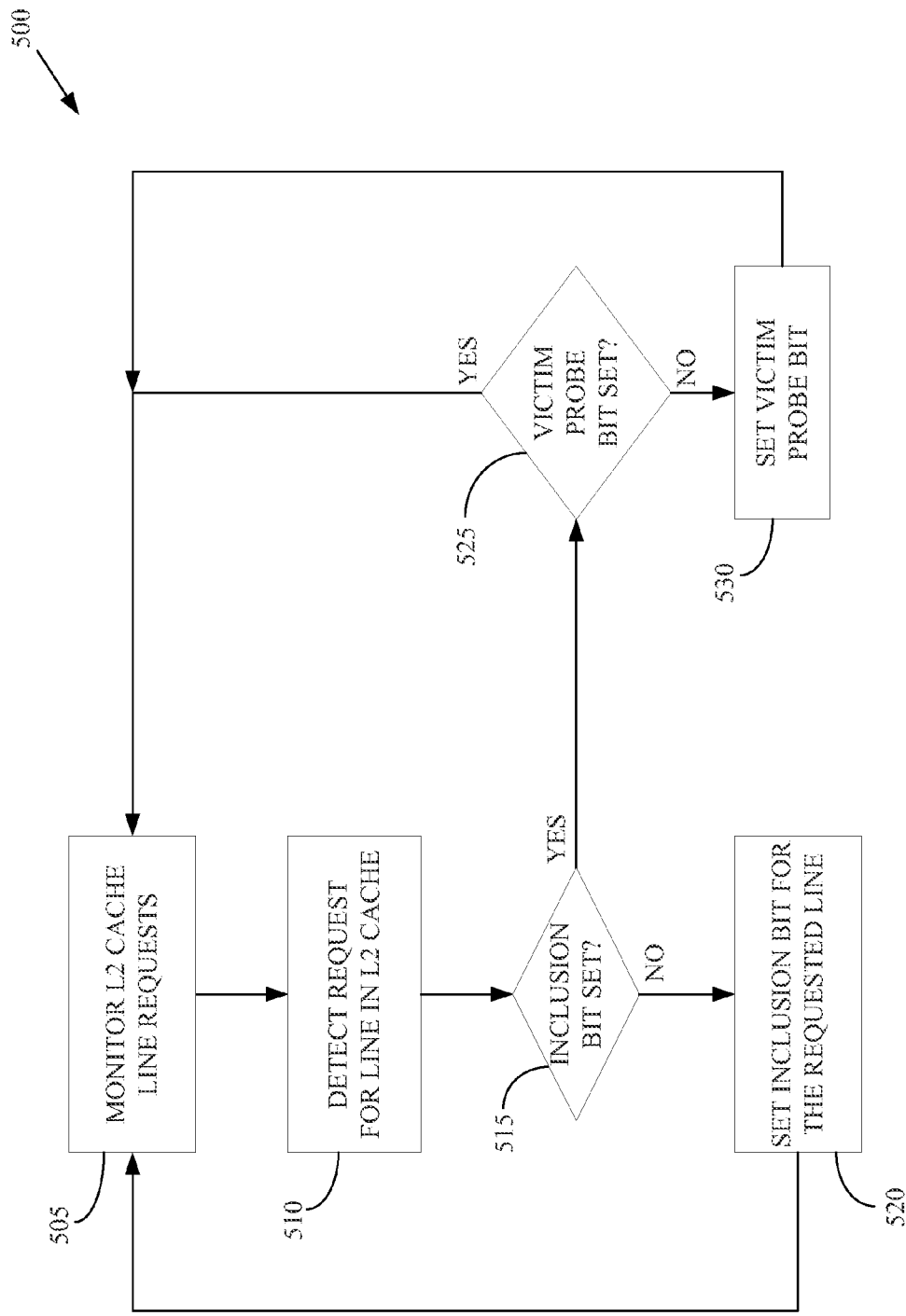
FIG. 5 conceptually illustrates one exemplary embodiment of a method for setting inclusion bits or victim probe bits for lines in a first cache.

FIG. 5 conceptually illustrates one exemplary embodiment of a method 500 for setting inclusion bits or victim probe bits for lines in a first cache. In the illustrated embodiment, the first cache is inclusive of lines in an associated set of second caches, which are divided into subsets of the second caches. For example, the first cache may be an inclusive L2 cache that is associated with L1 caches in multiple cores of a processing unit. The L1 caches in the cores include subsets of caches such as instruction caches, data caches, or other types of caches. A probe filter monitors (at 505) L2 cache line requests from the lower level L1 caches associated with the different processor cores. As discussed herein, the probe filter may be implemented within the L2 cache or may be a separate dedicated probe filter. When the probe filter detects (at 510) a request for a line in the L2 cache, the probe filter determines (at 515) whether an inclusion bit for the requested line has previously been set to indicate that the processor core that made the current request (i.e., the request detected at 510) has previously requested the same line. If the inclusion bit is not set, indicating that the processor core has not previously requested the same line, the inclusion bit for the requested line may be set (at 520).

The processor core may request a previously requested line, e.g., if the first request came from the L1 instruction cache in the core and a second request came from the L1 data cache in the core (or vice versa). Thus, if the probe filter determines (at 515) that the inclusion bit is set, indicating that the processor core has previously requested the same line, the probe filter may leave the inclusion bit in its current (set) state and determine (at 525) whether the victim probe bit line has been set to indicate that one of the multiple processor cores has previously sent multiple requests for the line in the L2 cache. If the victim probe bit is set, then the probe filter may leave the victim probe bit in its current (set) state and continue to monitor (at 505) L2 cache line requests. If the victim probe bit is not set, then the probe filter may set (at 530) the victim probe bit associated with the requested cache line. The probe filter may then continue to monitor (at 505) L2 cache line requests.

Figure 6:
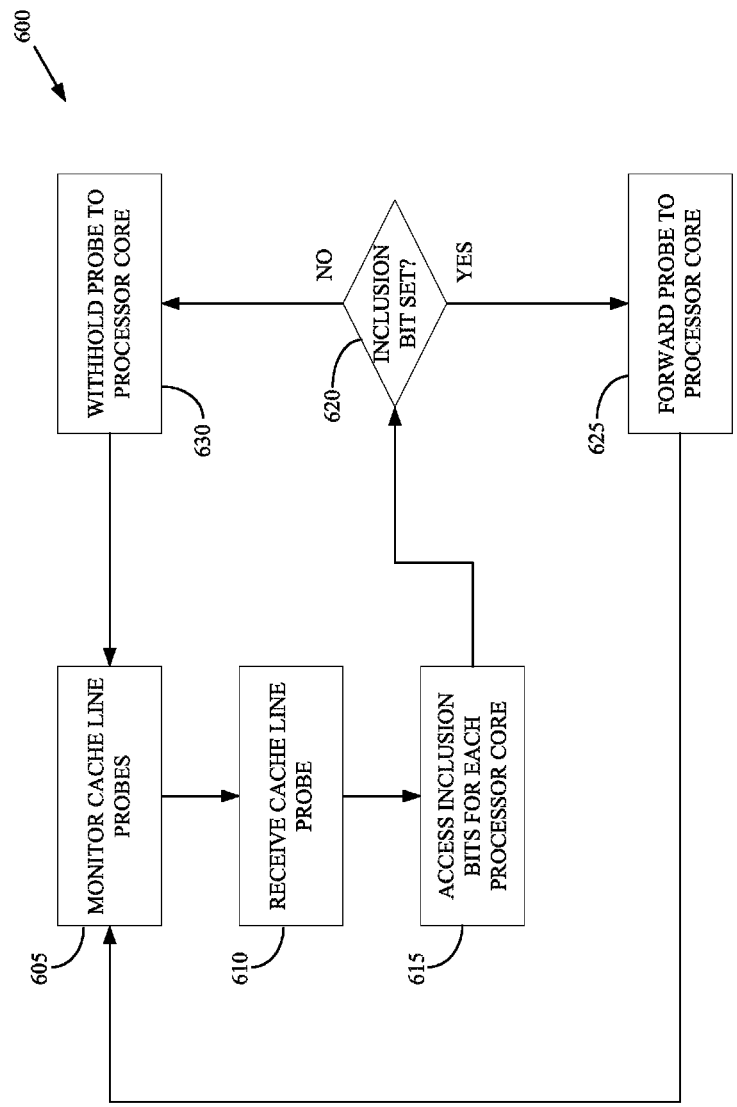
FIG. 6 conceptually illustrates one exemplary embodiment of a method of filtering cache line probes.

FIG. 6 conceptually illustrates one exemplary embodiment of a method of filtering cache line probes. In various alternative embodiments, the method 600 may be implemented as part of a higher level cache, such as an L2 cache, or in a dedicated probe filter, as discussed herein. The filter logic monitors (at 605) probes of sets of underlying caches such as L1 instruction or data caches associated with cores of a processor unit. For example, the filter logic may monitor (at 605) external probes that are received over system buses or bridges such as a north bridge. When a cache line probe is received (at 610), the filter logic may access (at 615) inclusion bits associated with the requested cache line. As discussed herein, each inclusion bit corresponds to one subset of the underlying caches such as the L1 instruction and data caches in a core.

The filter logic can determine (at 620) whether the inclusion bit for each processor core has been set. A set inclusion bit indicates that at least one cache in the associated subset of caches in the processor core includes the requested cache line. The filter logic may therefore forward (at 625) probes to the corresponding processor core when the filter logic determines (at 620) that the inclusion bit for the processor core is set. If the filter logic determines (at 620) that the inclusion bit for the processor core is not set, then the filter logic withholds or does not forward (at 630) the probe to the corresponding processor core. In alternative embodiments, the filter logic may filter, block, or mask the probe so that it is withheld or not forwarded to the corresponding processor core when the associated inclusion bit is not set. In one embodiment, the filter logic accesses (at 615) the inclusion bits for each processor core and determines (at 620) whether the inclusion bits are set before forwarding or blocking the cache probe. Once the filter logic has determined (at 620) the state of all the inclusion bits, the filter logic may concurrently forward (at 625) or withhold (at 630) probes to the different processor cores based on the values of the inclusion bits. For example, probes may be sent (at 625) in parallel to each processor core associated with a set inclusion bit.

Figure 7:
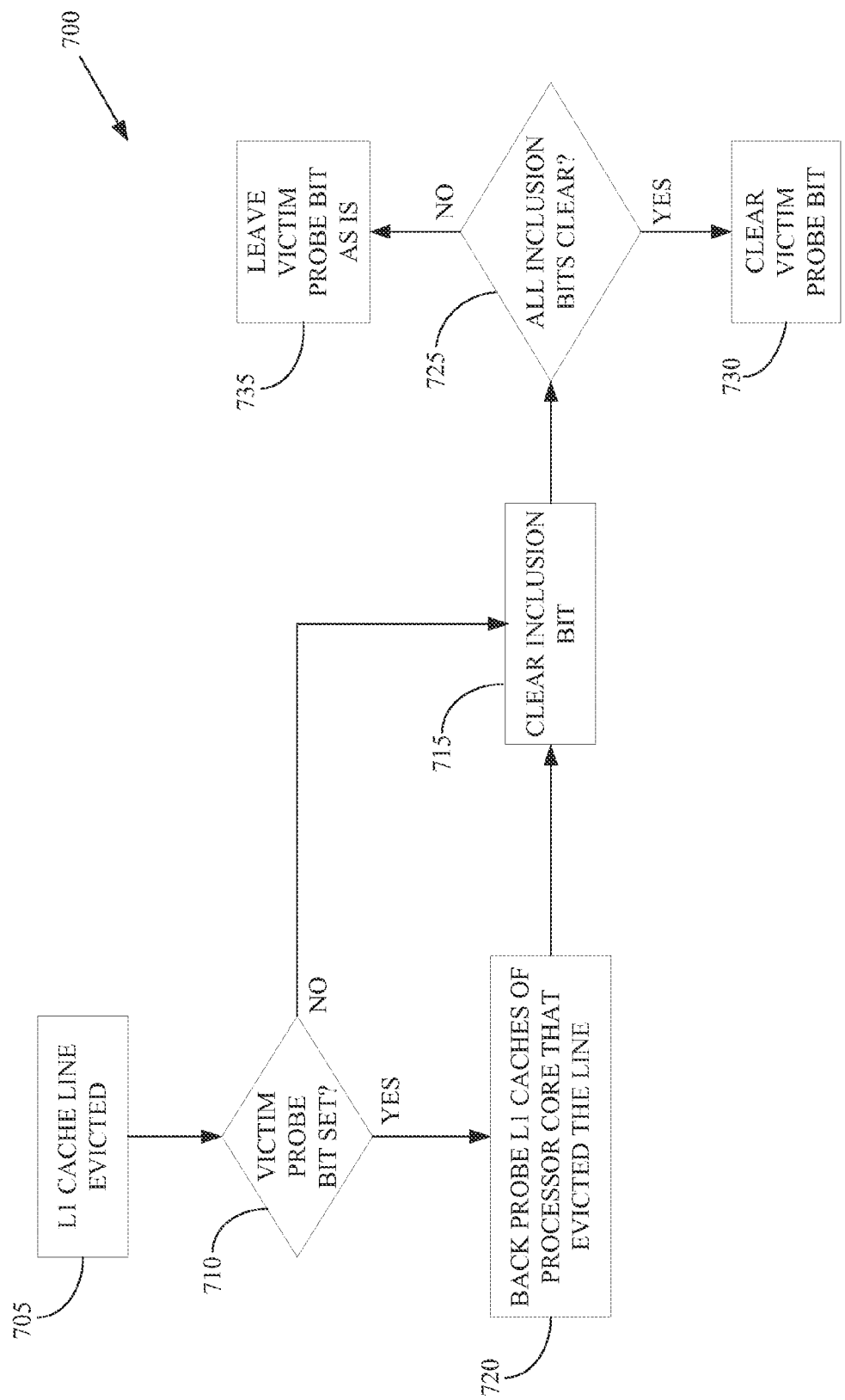
FIG. 7 conceptually illustrates one exemplary embodiment of a method for clearing inclusion bits or victim probe bits.

FIG. 7 conceptually illustrates one exemplary embodiment of a method 700 for clearing inclusion bits or victim probe bits. In the illustrated embodiment, the filter logic determines that a line from an underlying cache such as a line in an L1 cache in a processor core has been evicted (at 705). The filter logic determines (at 710) whether the victim probe bit corresponding to the evicted line has been set to indicate that the line is (or was prior to the eviction) resident in multiple caches of at least one of the processor cores. Because one victim probe bit is used for all the processor cores associated with the evicted line, the processor core associated with the multiple caches in which the line may be resident may not be the same as the processor core associated with the cache that evicted the line.

If the victim probe bit is not set, then the inclusion bit for the processor core that evicted the line is cleared (at 715). If the victim probe bit is set, then the filter logic back probes (at 720) the L1 caches of the processor core that evicted the line to make sure that any other copies of the line that may be resident in the different L1 caches of the processor core are also evicted or invalidated. The inclusion bit for the line may then be cleared (at 715) following the back probe.

The filter logic may also decide whether the victim probe bit associated with the evicted line should be cleared after the inclusion bit is cleared (at 715). In the illustrated embodiment, the filter logic determines (at 725) whether all the inclusion bits associated with the evicted line are clear, e.g., none of the inclusion bits are set. If the inclusion bits are clear, then the victim probe bit may also be cleared (at 730). If one or more of the inclusion bits is still set, indicating that one or more caches associated with one or more of the processor cores includes the evicted line, then the victim probe bit is left as is (at 735).

In one embodiment, evicting (at 705) a cache line causes state information to be transferred between the different caches. For example, when the instruction cache in a processor core evicts (at 705) a line, some branch prediction state information (which may also be referred to as attributes of the line) is copied back from the L1 instruction cache to the L2 cache, which then stores the branch prediction state information. A subsequent L1 instruction cache fetch for the line can be used to restore the attributes from the L2 cache to the L1 instruction cache so that the branch prediction state does not need to be warmed back up, which saves cycles.

Lines that are stored in the L2 cache may be protected using error correcting code (ECC). For example, an underlying L1 data cache may not be able to tolerate a parity error from the L2 cache and so the ECC is used to maintain error-free lines, as well as to detect or correct internal data corruption. However, when a line is stored in the L2 cache with attributes such as the branch prediction state information that may be stored in the L2 cache following eviction of a line from the L1 cache, the ECC for the evicted line may be dropped so that the branch prediction state information can be stored using the bits that were used for the ECC. In these embodiments, the evicted line may be protected by parity in the L2 cache. The evicted line may therefore include errors that are not detectable or correctable. Thus, when an L1 cache such as the data cache requests a line which is stored in the L2 cache with attributes instead of ECC bits, the line may first be invalidated in the L2 cache and the processor cores that may have a copy of the line. The line may then be refetched from memory and stored in the L2 cache with ECC protection.

Although refetching of lines that are stored with attributes (and without ECC protection) may reduce the failure rate, the performance impact may not be significant since the scenario is rare when the L1 caches in a processor core are not shared. However, in systems that implement sharing of the L1 instruction and data caches, refetching of lines may become much more likely and minimizing the performance impact of refetching may be more valuable and have a more pronounced effect on performance. In one embodiment, attributes of the evicted cache line may therefore not be stored in the L2 cache and the line may remain protected by ECC in the L2 cache. For example, the attributes of an evicted cache line may be dropped when the victim probe bit is set and so the line may remain protected by ECC in the L2 cache when the victim probe bit is set. Consequently, refetching of the lines in response to L1 cache requests may not be necessary when the line attributes are not stored in response to an eviction and the line remains protected by ECC. The net performance may therefore be improved because the overhead associated with warming up a branch prediction state is less than the overhead associated with refetching the line.

Embodiments of processor systems that can implement embodiments of probe filtering as described herein (such as the processor system or device 100) can be fabricated in semiconductor fabrication facilities according to various processor designs. In one embodiment, a processor design can be represented as code stored on a computer readable media. Exemplary codes that may be used to define and/or represent the processor design may include hardware description language (HDL), Verilog, and the like. The code may be written by engineers, synthesized by other processing devices, and used to generate an intermediate representation of the processor design, e.g., netlists, graphic database system II (GDSII) data and the like. The intermediate representation can be stored on computer readable media and used to configure and control a manufacturing/fabrication process that is performed in a semiconductor fabrication facility. The semiconductor fabrication facility may include processing tools for performing deposition, photolithography, etching, polishing/planarizing, metrology, and other processes that are used to form transistors and other circuitry on semiconductor substrates. The processing tools can be configured and are operated using the intermediate representation, e.g., through the use of mask works generated from GDSII data.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, comprising:
   filtering a probe of at least one of a plurality of first caches based on a plurality of first bits associated with a line indicated by the probe, wherein each of the plurality of first bits is associated with a different subset of the plurality of first caches, and wherein each first bit indicates whether the line is resident in a corresponding subset of the plurality of first caches, and wherein a second bit indicates whether the line is resident in more than one of the plurality of first caches in at least one of the subsets of the plurality of first caches.

2. The method of claim 1, further comprising setting one of the first bits to indicate that the line is resident in a subset of the plurality of first caches corresponding to the set one of the first bits.

3. The method of claim 2, further comprising setting the second bit in response to a request from one of the subsets of the plurality of first caches for the line when the first bit associated with the line and said one of the subsets is set.

4. The method of claim 3, wherein the first bits are stored by a second cache that is inclusive of lines in the plurality of first caches, and wherein setting said one of the first bits comprises setting said one of the first bits to indicate that the line in the second cache is resident in the corresponding subset of the plurality of first caches.

5. The method of claim 4, wherein the plurality of first caches and the second cache are part of a multi-level cache, wherein the first caches are smaller, faster, and at a lower level in the multi-level cache relative to the second cache.

6. The method of claim 5, wherein the second cache is an L2 cache and the plurality of first caches are L1 caches.

7. The method of claim 4, wherein the second bit is stored by the second cache and wherein setting the second bit comprises setting the second bit associated with the line in the second cache in response to a request from one of the subsets of the plurality of first caches for the line in the second cache when the first bit associated with the line and that one of the subsets is set.

8. The method of claim 3, further comprising clearing said one of the first bits in response to the line being evicted from the corresponding subset of the plurality of first caches.

9. The method of claim 8, wherein the evicted line is stored without attributes and with error correcting code protection when the second bit is set.

10. The method of claim 8, wherein clearing said one of the first bits comprises back-probing the corresponding subset of the plurality of first caches associated with said one of the first bits in response to the line being evicted from the corresponding subset of the plurality of first caches when the second bit is set.

11. The method of claim 8, further comprising clearing the second bit in response to the plurality of first bits being cleared.

12. The method of claim 1, wherein each subset of the plurality of first caches is associated with a different processor core.

13. The method of claim 12, wherein each subset of the plurality of first caches comprises an instruction cache and a data cache.

14. The method of claim 1, wherein filtering the probe comprises receiving the probe at a second cache or a dedicated probe filter and determining whether to forward the probe to said at least one of the plurality of first caches based upon values of the plurality of first bits and the second bit.

15. An apparatus, comprising:
   a plurality of first caches; and
   means for filtering a probe of at least one of the plurality of first caches based on a plurality of first bits associated with a line indicated by the probe, wherein each of the plurality of first bits is associated with a different subset of the plurality of first caches, and wherein each first bit indicates whether the line is resident in a corresponding subset of the plurality of first caches, and wherein a second bit indicates whether the line is resident in more than one of the plurality of first caches in at least one of the subsets of the plurality of first caches.

16. An apparatus, comprising:
a plurality of first caches; and
a probe filter configurable to filter a probe of at least one of the plurality of first caches based on a plurality of first bits associated with a line indicated by the probe, wherein each of the plurality of first bits is associated with a different subset of the plurality of first caches, and wherein each first bit indicates whether the line is resident in a corresponding subset of the plurality of first caches, and wherein a second bit indicates whether the line is resident in more than one of the plurality of first caches in at least one of the subsets of the plurality of first caches.

17. The apparatus of claim 16, further comprising a cache controller configurable to set one of the first bits to indicate that the line is resident in a subset of the first caches corresponding to the set one of the first bits.

18. The apparatus of claim 17, wherein the cache controller is configurable to set the second bit in response to a request from one of the subsets of first caches for the line when the first bit associated with the line and said one of the subsets is set.

19. The apparatus of claim 18, further comprising a second cache that is inclusive of lines in the plurality of first caches, and wherein the cache controller is configurable to set said one of the first bits to indicate that the line in the second cache is resident in the corresponding subset of the plurality of first caches.

20. The apparatus of claim 19, comprising a multi-level cache that comprises the second cache and the plurality of first caches, and wherein the first caches are smaller, faster, and at a lower level in the multi-level cache relative to the second cache.

21. The apparatus of claim 20, wherein the second cache is an L2 cache and the plurality of first caches are L1 caches.

22. The apparatus of claim 19, wherein the cache controller is configurable to set a second bit associated with the line in the second cache in response to a request from one of the subsets of the plurality of first caches for the line in the second cache when the first bit associated with the line and that one of the subsets is set.

23. The apparatus of claim 18, wherein the cache controller is configurable to clear said one of the first bits in response to the line being evicted from the corresponding subset of the plurality of first caches.

24. The apparatus of claim 23, wherein the evicted line is stored without attributes and with error correcting code protection when the second bit is set.

25. The apparatus of claim 23, wherein the cache controller is configurable to initiate back-probing of the corresponding subset of the plurality of first caches associated with said one of the first bits in response to the line being evicted from the corresponding subset of the plurality of first caches when the second bit is set.

26. The apparatus of claim 23, wherein the cache controller is configurable to clear the second bit in response to the plurality of first bits being cleared.

27. The apparatus of claim 16, wherein the probe filter is configured to determine whether to forward the probe to said at least one of the plurality of first caches based upon values of the plurality of first bits and the second bit.

28. The apparatus of claim 16, comprising a plurality of processor cores, and wherein each subset of the plurality of first caches is associated with a different one of the plurality of processor cores.

29. The apparatus of claim 28, comprising a plurality of instruction caches and a plurality of data caches, and wherein each subset of the plurality of first caches comprises one of the plurality of instruction caches and one of the plurality of data caches.

* * * * *